A. BAKER.
Making Fences.
No. 3,989.
Patented April 10, 1845.
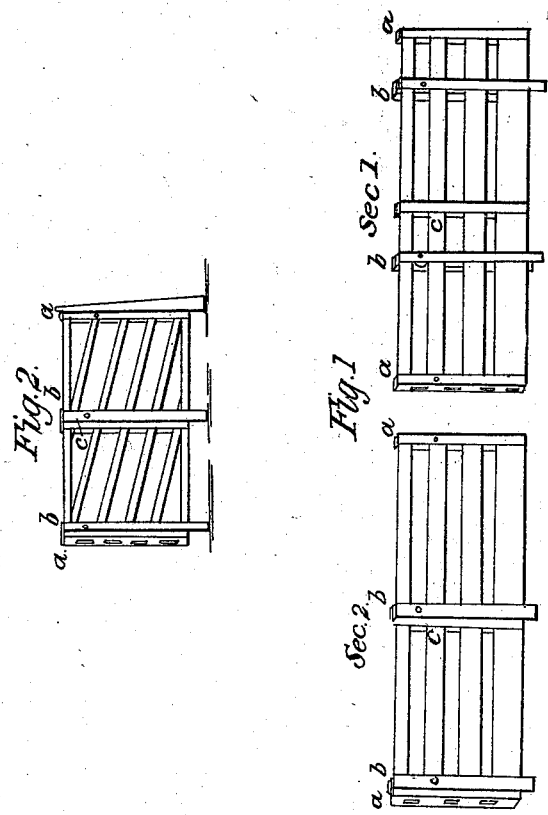

UNITED STATES PATENT OFFICE.

ARNON BAKER, OF WESTERN, NEW YORK.

BALANCE SLIDING GATE FOR FENCES.

Specification of Letters Patent No. 3,989, dated April 10, 1845.

*To all whom it may concern:*

Be it known that I, ARNON BAKER, of the town of Western, in the county of Oneida and State of New York, have invented a new and useful Machine, Being a Self-Balancing Sliding Gate; and I do hereby declare that the following is a full and exact description.

The gate is constructed of any desired length and rests on two rollers or small wheels affixed to upright posts. These rollers play beneath a horizontal bar of the gate and thus the weight of the gate is sustained entirely on the rollers. These rollers are placed at such points that the gate always balances and plays easily on the rollers whether open or shut or partly open. The posts to which the rollers are affixed are placed—one of them immediately adjoining the passage way—the other at a convenient distance, according to the length of the gate, from the first in a direction from the passage way. The passage way is closed (when the gate is shut) by the projecting of a part of the gate across the same from the roller post adjacent to the same, the residue of the gate remains (not across the passage way) but projecting the opposite side of this roller post, resting on the two rollers and balancing the post which projects across the passage way. When the gate is open the other end projects back of the roller post most distant from the passage way in the same manner as the end next the passage way projects across that when shut. Thus the gate rolls back and forth on the rollers and is opened and shut at pleasure—being always balanced and sustained on the rollers.

Section 1 of Figure 1 in the plate hereunto annexed represents such a gate as is above described standing partly open.

*a a* represents the gate; *b, b* are the roller posts in which the rollers are affixed beneath the top bar of the gate. *c* is a center cross bar of the gate which not only strengthens it but prevents it from projecting so far either way in opening or shutting as to lose its balance.

Sec. 2 of Fig. 1, hereunto annexed represents such a gate as is above described entirely shut.

Where a gate is desired for a passageway wider than can conveniently be closed by a single section of said gate, two sections may be combined as in said Fig. 1, in said plate and then the projecting ends of the two sections will meet in the center of the passage way where they can be stayed by a hook and staple or other fastening. The rollers may be applied under the horizontal bar at the top of the gate or lower down as deemed advisable. Points may be used also instead of rollers—and then the gate will slide on these points.

*Method of construction.*—This may be in any form which will recognize and apply the above principle. For ordinary form gates I use for the gate common fence boards of an appropriate width, and the cross bars at *a a* and *c*, Fig. 1, are formed by applying similar boards each side of the horizontal bars and nailing through the three thicknesses. The roller posts are common posts set in the ground with an opening made through the posts above the ground to admit the insertion of the rollers and horizontal gate bars, or the roller and gates are applied to the outside of the post, and then strips of wood are attached by pins outside of these to retain them in their places. A self shutting gate is constructed on the above principles by inclining from a horizontal position the bar or bars which run on the rollers. The gate will then shut itself by its own weight. A gate of this description is shown in Fig. 2 of the plate annexed hereunto.

What I claim as my invention and desire to secure by Letters Patent is—

Running the self balanced gate on rollers or pins attached to the posts and between the rails of the gate by means of which the counterpoise employed in railway drawbridges as also a rail below or above in the passage of the gate, as in sliding doors, are dispensed with. Whether this be applied with the rails of the gate horizontal or inclined to cause the weight of the gate to close it as described.

ARNON BAKER.

Witnesses:
GEORGE BRAYTON,
ALBERT BRAYTON, Junr.